July 21, 1970
M. L. BOX ET AL
3,521,176
DEVICE FOR VERIFICATION OF LINEAR DEVIATION OF
A FREQUENCY MODULATED SIGNAL
Filed Feb. 14, 1968
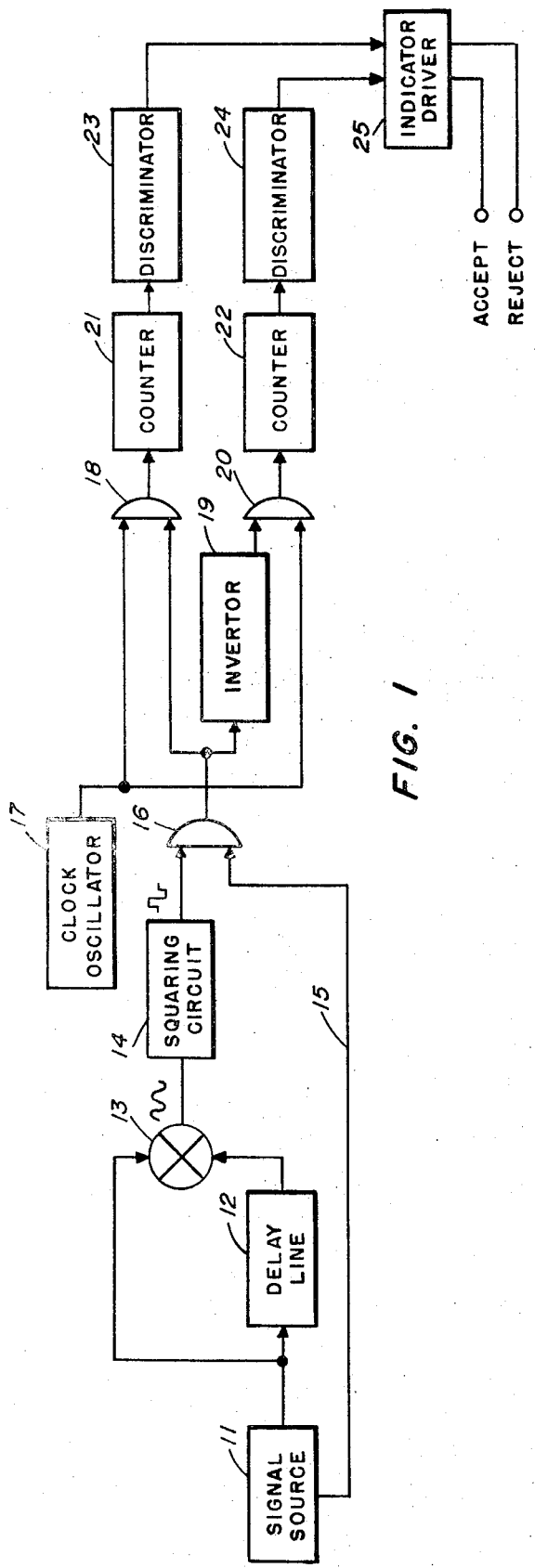
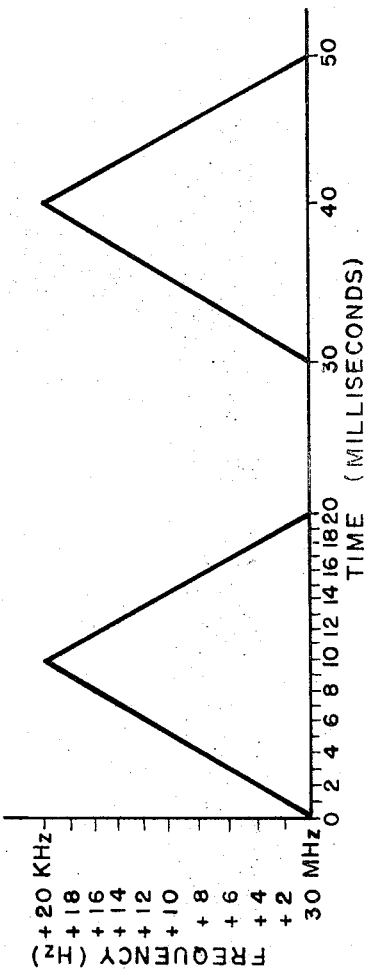
INVENTORS
MAX L. BOX
PETER A. HEACOCK
BY
ATTORNEY

United States Patent Office 3,521,176
Patented July 21, 1970

---

3,521,176
DEVICE FOR VERIFICATION OF LINEAR DEVIATION OF A FREQUENCY MODULATED SIGNAL
Max L. Box, Palos Verdes Peninsula, and Peter A. Heacock, Culver City, Calif., assignors, by mesne assignments, to the United States of America as represented by the Secretary of the Navy
Filed Feb. 14, 1968, Ser. No. 705,484
Int. Cl. H03b 3/04
U.S. Cl. 328—141                               6 Claims

ABSTRACT OF THE DISCLOSURE

This invention comprises a system for verifying the linearity of the frequency change of an input signal. The output of a source is fed to a comparator and a delay line. The output of the delay line in turn is also fed to the comparator where it is compared with the output of the source. As long as the output of the source is linear, the difference voltage received at the output of the comparator will be constant. The output of the comparator is fed to a digital counter which is synchronized with the output of the signal source and which gives an output indication of the linearity or non-linearity of the frequency change of the voltage source.

STATEMENT OF GOVERNMENT INTEREST

The invention defined herein may be manufactured and used by or for the Government of the United States of America for governmental purposes without the payment of any royalties thereon or therefor.

BACKGROUND OF THE INVENTION

Field of the invention

The invention relates to a linearity measurement system utilizing a unique application of a fixed delay line, and more particularly to a system of the character described utilized. The purpose is to verify the linearity of the frequency excursion of a variable frequency signal during short intervals of time.

Description of the prior art

Previous techniques generally utilized a conventional frequency discriminator and oscilloscope. The output of the discriminator was displayed on the oscilloscope providing a visual plot of frequency versus time. Several errors are encountered by use of this method. The factors which contribute to the errors are the frequency response of the discriminator and the oscilloscope, instability and drift of the discriminator and the oscilloscope, and the non-linearity of the discriminator and the oscilloscope. Human error is also a factor because the operator is forced to make a visual determination of what appears to be linear or non-linear.

SUMMARY OF THE INVENTION

The invention generally provides a variable frequency source connected to a mixer and a delay line. The output of the delay line is also connected to the mixer. The mixer compares the two signals and gives an output signal which represents the difference between the two input signals. As long as the difference between the two input signals is constant, the frequency change of the signal source will be linear. A frequency counter is synchronized with a signal from the signal source and senses the output of the mixer. If the output of the mixer is a predetermined constant, the frequency counter will give an accept signal indicating that the frequency from the signal source is increasing or decreasing linearly. If the output from the mixer is not the predetermined constant, the frequency counter will give a reject signal indicating that the frequency is not changing linearly.

This invention presents a significant advance over the prior art in that it allows precise measurement of slope and linearity of frequency deviation. Its accuracy is dependent only upon the stability of a delay line and the accuracy of a digital frequency counter. The delay line contemplated for use in embodiments of the invention is of the ultrasonic, quartz type and delay stability can be held to within 0.1 microsecond over a wide range through the use of optionally supplied ovens. The accuracy of frequency counters can be kept down to within a ±1 count ambiguity.

It is an object of this invention to provide an improved method for vertifying the linearity of the frequency change of a signal.

It is a further object of the invention to provide a highly accurate method for verifying the linearity of the frequency change of a signal, The exact nature of this invention, as well as other objects and advantages thereof, will be readily apparent from consideration of the following specification relating to the annexed drawings in which:

BRIEF DESCRIPTION OF DRAWINGS

FIG. 1 is a circuit diagram of the system provided in the present invention;

FIG. 2 is a diagram showing linear rate of change of frequency of a signal.

DESCRIPTION OF PREFERRED EMBODIMENTS

Referring to FIG. 1, there is shown a source of frequency modulated signals 11, a delay line 12 and a mixer 13 connected to receive the output of the signal source. The output of the delay line is also connected to the mixer 13. The delay line is of the ultrasonic quartz type which is available with delays up to 4500 microseconds. The output from the mixer 13 represents the difference between the signal from the source and the delay line. As can be seen in FIG. 2, as long as the variation in the frequency modulated signal is linear with respect to time, the difference between the two signals will be constant. The difference signal is passed to a squaring circuit 14. The output of the squaring circuit is fed to gate 16. A synchronization signal is also connected from the signal source to gate 16. The output of gate 16 is fed to gate 18 and through inverter 19 to gate 20. A source of clock oscillations, oscillator 17, is also connected to the inputs of gates 18 and 20. The outputs of the gates are fed to counters 21 and 22, and discriminators 23 and 24. The outputs of the discriminators are connected to indicator driver 25.

In operation, the output of signal source 11 is a frequency modulated signal, that is, a signal which varies in frequency with reference to a main carrier frequency. The circuit above described is operable to detect the presence or absence of a predetermined linearity in this signal. In the example of FIG. 2, which shows a linear increase and decrease of frequency, a constant 2 kHz. frequency difference at the output of the mixer 13 represents a linear frequency deviation of the source under test. As will be seen from the discussion below, the frequency difference to which the circuit is responsive can be varied by changing the logic of discriminators 23 and 24.

In the example of FIG. 2, the modulated signal source output having a carrier frequency of 30 mHz. is applied to a 1,000 microsecond delay line 12 and to the input of mixer 13. Nothing occurs until 1 millisecond later when an output appears from the delay line at the frequency of the signal source at time Zero. By this time, however, the frequency from the signal source has risen to a value of 2 kHz. The difference frequency between the delay line and input as detected by the mixer 13, is therefore 2 kHz. It can be seen that if the frequency deviation slope remains constant, the difference frequency will remain constant at 2 kHz. until time 10. The same difference frequency will also be present on the down slope from time 11 until time 20.

The 2 kHz. output of the mixer is received by squaring circuit 14 which provides a squared output signal having a pulse width proportional to the frequency of the input signal.

The squared output is fed to one terminal of gate 16 which has been opened by a synchronization signal from source 11 through lead 15. The synchronization signals are timing signals and, in the example of FIG. 2, occur at 10 milliesecond intervals. In operation their use is analogous to the triggered sweep "external" synchronization utilized with oscilloscopes. The synchronization signals prevent counter readout during discontinuities in the waveform. The system could also be arranged to generate synchronization signals from a separate source as with internally synchronized oscilloscopes.

The positive half of the output of the squaring circuit opens gate 18 while the negative half of the signal is inverted at 19 and opens gate 20. Gates 18 and 20 also receive signals from clock oscillator 17. As the width of the pulses from the squaring circuit is proportional to the frequency difference sensed by mixer 13, the gates will pass a predictable number of pulses for a given frequency difference (2 kHz. in the example of FIG. 2). These pulses are counted by counters 21 and 22. Discriminators 23 and 24 in turn verify if the correct or incorrect number of pulses have been received. The output of the discriminators energize indicator drivers 25 to give an accept signal if the correct number of pulses is received or a reject signal if the correct number has not been received. The receipt of the correct number of pulses indicates that the signal is linear.

The frequency difference giving rise to an accept signal and therefore the linearity of signal frequency deviation to which the circuit is responsive, may be varied by changing the pulse count to which the discriminators are sensitive.

Obviously many modifications and variations of the present invention are possible in the light of the above teachings. It is, therefore, to be understood that within the scope of the appended claims the invention may be practiced otherwise than as specifically described.

What is claimed is:
1. A circuit for detecting the frequency difference between two signals comprising:
 a first source of variable frequency signals;
 a second source of variable frequency signals, said second source including a delay line connected to receive the output of said first source;
 a comparator connected to said first and second sources and operative to give an output proportional to the frequency difference of said signals;
 detecting means including a squaring circuit connected to receive the output of said comparator and operable to give output signals whose width is proportional to the output signal of said comparator;
 a pulse source;
 a first gate connected to receive the output of said squaring circuit and said pulse source and operable upon receipt of a signal from said squaring circuit to pass the output of said pulse source for the duration of the signal from said squaring circuit; and
 a verifying circuit connected to receive the output of said first gate and operable to indicate if a constant number of pulses is passed every time said first gate receives a signal from said squaring circuit.

2. A circuit as in claim 1 wherein said detecting means further comprises:
 an inverter connected to said squaring circuit and operable in invert negative-going pulses from said squaring circuit;
 a second gate connected to receive the output of said inverter and said pulse source and operable upon receipt of a signal from said squaring circuit through said inverter to pass the output of said pulse source for the duration of the signal from said squaring circuit;
 means connecting said verifying circuit to receive the output of said second gate and operable to indicate if a constant number of pulses is passed when said second gate receives a signal from said squaring circuit through said inverter.

3. A circuit as in claim 2 wherein said detecting means further comprises:
 a third gate connected between said squaring circuit and said first and second gates and operable in response to a signal from said first source to pass the signal from said squaring circuit to said first and second gates.

4. A device for verifying the linearity of the frequency deviation of a signal comprising:
 a source of frequency varying signals;
 a delay line connected to receive the output of said source;
 a mixer connected to receive the output of said source and said delay line to give an output signal representative of the frequency difference between the signal from the delay line and the signal source, said frequency difference being constant when the frequency deviation of said signal is linear;
 verifying means including a squaring circuit connected to receive the output of said mixer and operable to give output signals whose width is proportional to the output signal of said mixer;
 a pulse source;
 a first gate connected to receive the output of said squaring circuit and said pulse source and operable upon receipt of a signal from said squaring circuit to pass the output of said pulse source for the duration of the signal from said squaring circuit; and
 a verifying circuit connected to receive the output of said first gate and operable to indicate if a constant number of pulses is passed every time said first gate receives a signal from said squaring circuit.

5. A device for verifying the linearity of the frequency deviation of a signal as in claim 4 wherein said verifying means further comprises:
 an inverter connected to said squaring circuit and operable to invert negative-going pulses from said frequency circuit;
 a second gate connected to receive the output of said inverter and said pulse source and operable upon receipt of a signal from said squaring circuit through said inverter to pass the output of said pulse source for the duration of the signal from said squaring circuit;
 said vertifying circuit being connected to receive the output of said second gate and operable to indicate if a constant number of pulses is passed every time said second gate receives a signal from said squaring circuit through said inverter.

6. A device for verifying the linearity of the frequency deviation of a signal as in claim 5 further comprising:
 a third gate connected between said squaring circuit and said first and second gates and operable in response to a signal from said first source to pass the signal from said squaring circuit to said first and second gates.

References Cited

UNITED STATES PATENTS 3,054,064  9/1962  Sherman _____ 328—141 X
3,404,345  10/1968  Marx et al. _____ 328—141

JOHN S. HEYMAN, Primary Examiner

U.S. Cl. X.R.

328—133